3,833,739
VITAMIN ENRICHED POTATO FLAKES
Dennis C. Pedersen, Minneapolis, and Philip M. Sautier, Edina, Minn., assignors to The Pillsbury Company, Minneapolis, Minn.
No Drawing. Filed Aug. 25, 1972, Ser. No. 283,880
Int. Cl. A23b 7/03; A23l 1/12, 1/30
U.S. Cl. 426—72           5 Claims

ABSTRACT OF THE DISCLOSURE

A vitamin enriched, dehydrated potato flake product is described herein. The potato flakes are irregular in shape having a thickness ranging from 0.005 to 0.015 inches and a diameter of approximately 1/8 to 1/4 inch. Vitamin flakes of approximately the same size are incorporated with the potato flakes and are nonsegregating and difficult to detect visually. The vitamin flakes comprise from 50% to 75% fat which has a melting point of from 110° F. to 165° F. and alkyl chain lengths containing from 6 to 26 carbon atoms. Water-soluble vitamins and minerals make up the remainder of the flakes and are incorporated in and encapsulated by the fat.

BACKGROUND OF THE INVENTION

The present invention relates to a dehydrated potato flake product enriched with vitamin flakes. The vitamin flakes, which comprise water-soluble vitamins and minerals encapsulated in fat, do not readily segregate within the potato flake product and are practically invisible to the eye. Essentially no degradation of the vitamins and minerals occurs during storage and color or flavor effects due to the encapsulated vitamins and minerals are limited.

The manufacture of dehydrated, mashed potatoes in the form of potato flakes is a fairly recent development. See, for example, the processes disclosed in U.S. Pat. 2,759,832 and 2,780,552 issued to James Cording, Jr. and Miles J. Willard, Jr. The procedure generally involves peeling and slicing raw potatoes, precooking the potatoes in water or steam, cooling the precooked slices, a final cooking in steam and then mashing the cooked potatoes. Various additives can be incorporated into the mash including antioxidants, emulsifiers and sulfite stabilizers. The potato mash is then dehydrated and comminuted to yield the desired potato flakes. Upon adding hot water and milk, the flakes reconstitute to provide mashed potatoes having satisfactory appearance and flavor.

A major disadvantage of this rather harsh process is that the potato flakes, when compared with raw potatoes, are substantially reduced in nutritional value. Many attempts have been made to alleviate this problem by incorporating nutritional additives such as vitamins and minerals into the potatoes during processing. See, for example, Pader, U.S. Pat. 3,343,970 (addition of Vitamin $B_1$ to flaked potatoes) and Irmiter et al., U.S. Pat. 3,027,264 (addition of Vitamin C to flaked potatoes). However, these methods of vitamin addition presented still other problems since many of the nutritional additives were unstable during the processing steps and some nutritional additives adversely affected the flavor and color of the reconstituted potatoes. Additionally, the finely ground minerals and vitamins readily segregated in the final product thereby causing great disparities of enrichment in portions removed from the package. Accordingly, large excesses of vitamins and minerals were required to obtain the original nutritional level of raw poatoes in all portions of the packaged product.

SUMMARY OF THE INVENTION

A vitamin enriched, dehydrated potato flake product is described wherein the potato flakes have thicknesses from 0.005 to 0.015 inches and irregular surface diameters of 1/8 to 1/4 inches. To the potato flakes are added from about 0.1% to about 5% by weight of the flaked potatoes of vitamin flakes having thicknesses from 0.005 inches to 0.025 inches and irregular surface diameters of from 1/16 to 1/4 inches. These vitamin flakes are comprised of from 50 to 75% fat having alkyl chains containing from 6 to 26 carbon atoms and melting points of from 110° F. to 165° F.; from 10 to 50% of water soluble vitamins having a particle size of less than 0.018 inches and from 0 to 40% of mineral having a particle size of less than 0.018 inches. The vitamins and minerals are encapsulated within the fat and formed into flakes.

A principal advantage of this improvement is that dehydrated potato flakes can readily be enriched with vitamins and minerals to any nutritional level, preferably a level equal to freshly dug potatoes. Another advantage is that the vitamins and minerals are not subjected to the severe potato processing conditions and therefore are not degraded. A further advantage is that the vitamins are encapsulated and thus protected from contact with the potato flakes, water or other vitamins and minerals. Another advantage of this invention is that the vitamins and minerals are not visible to the consumer within the flaked potato product and the vitamins and minerals do not readily segregate in the final product. Yet another advantage is that the vitamins and minerals do not adversely affect the flavor or color of the reconstituted potato product.

DESCRIPTION OF THE PREFERRED EMBODIMENTS

This invention relates to a vitamin enriched, dehydrated potato flake product. Vitamin flakes are added to conventional potato flakes to obtain, preferably, the original nutritional level of raw potatoes. The vitamin flakes are comprised of vitamins and minerals encapsulated in fat. The vitamin flakes are essentially nonsegregating in the potato flakes and substantially invisible to the eye.

More specifically, dehydrated flaked potatoes are produced by several commercial processes. In one such process, the cooked potatoes are reduced to a mash which is dried on a rotating metal drum dryer. The sheet of dried material is removed from the drum and broken into flakes. These flakes are then packed for shipment. The dehydrated potato flakes used herein can be made by this or any other available process. Some suitable methods are outlined in U.S. Pats. 2,780,552 and 3,553,304.

When potato flakes are manufactured, it has been found desirable to maintain the flake thickness in a mono-cellular layer having a thickness of from about 0.005 to 0.015 inches and preferably in a range of about 0.007 to 0.010 inches. According to U.S. Pat. 2,780,552, flakes having a thickness of less than 0.003 inches show excessive cell rupture and flakes measuring over the maximum dimension show increasing agglomeration of cells. The surface diameters of these flakes can and do vary widely but it has been found that a majority (over 60% and preferably over 80%) of the surface diameters should range from 1/16 to 1/4 inch for commercial purposes. Preferably, over 60% of the surface diameters should range from 1/8 to 1/4 inch. Because of the many and varied configurations of these flakes, surface diameter is used to indicate the longest surface dimension of the flake.

It has also been found desirable to reduce the final moisture content of the product to between 4 and 10%. Generally, the moisture is reduced by drying the potato mash on a heated drum dryer. If a moisture content of over 10% is present in the final product, storage stability of the potatoes may be adversely affected.

The potato flakes derived from any of the above processes have a packed density, i.e., bulk density after settling, ranging from 0.2 to 0.35 gram per cubic centimeter (g./cc.), preferably 0.24 to 0.26 g./cc. and, when white potatoes are used, the color is white to cream colored. There are generally no darkening effects due to the methods of processing.

Vitamin flakes are then added to the dehydrated potato flakes to, preferably, attain a nutritional value equal to freshly dug potatoes. The vitamin flakes have thicknesses ranging from about 0.005 inches to 0.025 inches, preferably from about 0.007 inches to 0.020 inches. The surface diameters of the vitamin flakes, like those of the potato flakes, are of irregular configuration and the size distribution of these flakes conforms to the normal bell-shaped distribution curve. A majority (60%, and preferably 80%) of the vitamin flakes have surface diameters ranging from 1/16 inch to 1/4 inch. The density of these flakes ranges from about 0.45 g./cc. to 0.55 g./cc. Vitamin flakes meeting the above size criteria are essentially non-segregating in the dehydrated potato product. This non-segregating feature is essential and critical to this invention to obtain proper distribution of vitamins and minerals in each portion of the reconstituted potato product.

In addition to the size criteria, the vitamin flakes must be free flowing at normal temperatures (below 95° F.) to facilitate processing of the product. Additionally, this temperature stability insures that the flakes can be transported and stored without lumping. Another temperature related requirement for these vitamin flakes is that the vitamin flakes must not "grease" the potato flakes in the final product. The encapsulating agent, therefore, is a very important component of the vitamin flakes.

The encapsulating agents used herein are water-insoluble substances, solid or semisolid at room temperature, consisting predominently of glyceryl esters of fatty acids. This definition includes monoglycerides, diglycerides and triglycerides which, for convenience, will be called "fats" herein.

Fats used herein preferably are noncolored, that is, water white. This color is desirable because it is very similar to the color of the flaked potatoes and, therefore, the final vitamin flake is not readily discernible within the flaked potato.

The fat should also have a Wiley melting point within the range of 110° F. to 165° F., preferably from 130° F. to 155° F. Wiley melting points are very difficult to obtain with monoglycerides because monoglycerides are soluble in alcohols. Therefore, the congeal point is used as the equivalent of the Wiley melting point. These melting characteristics of the fats are essential to insure that the vitamins and minerals are properly encapsulated while packaged and properly released during the final rehydration step. If the melting point of the fat is too low, the vitamins and minerals may be exposed in the package and degraded with concomitant color and flavor changes of the flaked potato product. Additionally, the flakes may become greasy and adversely affect the rehydration characteristics of the potato flakes. If the melting point of the fat is too high, the vitamins and minerals may not be released from the vitamin flake during rehydration of the product and may contribute a waxy, grainy texture to the final product.

The fats as described above having these melting points must be predominantly comprised and saturated alkyl moieties containing from 6 to 26 carbon atoms and preferably from 12 to 18 carbon atoms. The fats can be used singly or in combination to attain a melting point in the above range.

A number of fats and combinations of fat within the above ranges are disclosed in Eckey, *Vegetable Fats and Oils* (1954) at pages 48 through 74 and Swern, *Bailey's Industrial Oil and Fat Product* (3rd ed. 1964) at pages 108 through 110. Disclosed therein are the following specific fats having melting points within the range of 110° F. to 165° F.; capric monoglyceride, lauric monoglyceride, myristic monoglyceride, capric diglyceride, lauric diglyceride, myristic diglyceride, lauric triglyceride, myristic triglyceride, palmitic triglyceride and stearic triglyceride. Mixtures of these fats and other similar fats having varying alkyl chain lengths and having a Wiley melting point within the range of 110° F. to 165° F. can be used herein.

Commercially available natural fats that meet the melting point criteria include soybean oil, cottonseed oil, safflower oil and tallow hydrogenated to a melting point of between 110° F. and 165° F.

One particularly preferred fat is a non-distilled, hard vegetable derived mixture of monoglycerides and diglycerides sold by Durkee Industrial Foods under the mark DUR–EM 207. Its properties are set forth in Table 1.

TABLE 1

| | |
|---|---|
| Form | Beaded solid. |
| Color | Cream to white. |
| Lovibond, color, max. | 5 Red. |
| Capillary melting point, ° F. | 140–145. |
| Alpha monoglyceride, min. | 52%. |
| Moisture, max. | Trace. |
| Iodine value, max. | 2. |
| Free fatty acid, max. | 1.5%. |
| Free glycerine, max. | 3.0%. |

As can be readily seen from Table 1, most commercial fats contain some free fatty acids and free glycerine. It is contemplated herein that such products will be present in the commercial fat mixtures.

Another preferred fat is a distilled monoglyceride sold by Eastman Chemical Products, Inc. under the mark Myverol. Myverol is a hydrogenated vegetable oil having a congeal point of 158° F. Essentially all of the alkyl moieties are saturated. The alkyl chain length distribution is as follows:

| Carbon atoms: | Percent |
|---|---|
| $C_{14}$ | 0.02 |
| $C_{16}$ | 12.2 |
| $C_{18}$ | 85.6 |
| $C_{20}$ | 2.0 |

The vitamin flake is comprised of from 50% to 75% of the above-described fat. In a preferred embodiment, the flake is comprised of from 60% to 70% by weight fat. This amount of fat is sufficient to properly encapsulate the vitamins and minerals without loading the potato product with excess fat.

The vitamins suitable for use in this invention are all nonreactive with the fat. Some oil-soluble vitamins can be used herein, such as Vitamin A. However, in most applications it is highly preferred that only water-soluble vitamins be utilized in these vitamin flakes because of the tendency of the fat-soluble vitamins to remain at the surface of the vitamin chip where they may be degraded or where they may cause color or flavor degradation of the potato product.

The preferred water-soluble vitamins include Vitamin $B_1$, (thiamine), Vitamin $B_2$ (riboflavin), Vitamin $B_6$ (pyridoxine hydrochloride), Vitamin C (ascorbic acid), niacin, folacin, biotin and pantothenic acid. These vitamins can be used singly or in any combination within the vitamin flake.

The vitamins are utilized in granular form and generally have a particle size diameter of less than 0.018 inches. This size is required to obtain the proper thickness of vitamin flake without exposing the vitamins. Preferably, the vitamins are within a size range such that 70% of the particles are less than 0.003 inches.

The following table further characterizes the preferred particle size of the vitamins:

TABLE 2

Preferred particle size

| Mesh size (U.S. Bureau of Standards sieve size) | Min. percent through | Mesh opening in inches |
|---|---|---|
| 60 | 96 | 0.0098 |
| 200 | 70 | 0.0029 |
| 325 | 40 | 0.0017 |

From about 10% to about 50% of the vitamin flake is comprised of the above vitamins. If substantially more vitamins are utilized in the flakes than specified hereinbefore, it is difficult to encapsulate the vitamins with the available amount of fat. If less vitamins are used in the flakes, the potato flakes carry an increased fat load and a substantial increase in calories.

From about 0% to about 40% of the vitamin flake is comprised of minerals. The minerals utilized herein are also nonreactive with the fat and with the potato product and preferably are not oil soluble. Therefore, the minerals retain their integrity within the fat and are readily dispersed in the mashed potatoes during the preparatory step of rehydrating the potato flakes. The particle size of the minerals must also be les than 0.018 inches and preferably is such that 70% of the particles are less than 0.003 inches as described above.

Specific minerals which may be added to the vitamin flakes include calcium, iodine, phosphorous, iron and magnesium. These minerals are added as food grade salts such as dicalcium phosphate, tricalcium phosphate, potassium iodide and ferric orthophosphate.

The vitamin flakes can be manufactured by any suitable method. Generally, the fat is melted and the vitamins and minerals are added, with agitation thereto. The molten mass is then flaked by any of the well-known methods. Preferably, the molten fat mixture is fed to the nip of a two-roll, chill roll. One roll is chilled and the other roll is heated. The fat is solidified on the chilled roll and scraped therefrom with a doctor blade. The continuous sheet obtained from the chill roll is rubbed through a mesh screen or cut to give pieces with a surface diameter of approximately ¼ inch.

The vitamin flakes are mixed with the potato flakes in amounts ranging from 0.1 to 5% by weight of the potato flakes. To obtain proper distribution of the vitamin flakes in the potato flake product, the vitamin flakes are added by a proportional feeder into a stream of potato flakes in a continuous mixer. In a preferred embodiment, from 0.5 to 1% vitamin flakes by weight of the potato flakes are incorporated into the potato product.

The final vitamin enriched potato product has the same appearance as ordinary dehydrated flaked potatoes. The vitamin flakes are substantially the same color and shape as the potato flakes, are practically invisible to the eye and do not segregate in the package. There are no color or odor negatives associated with the incorporation of these flakes with dehydrated potato flakes.

It is, of course, possible to color the fat to emphasize the addition of vitamins and minerals to the final product.

EXAMPLES

A vitamin enriched potato product is described above. The following examples will describe specific embodiments of the above invention.

Example I

A distilled monoglyceride was added to a steam-jacketed kettle and heated to between 180° F. and 185° F. until the monoglyceride was completely melted. The monoglyceride was a hydrogenated vegetable oil having a congeal point of 158° F. Essentially all of the alkyl moieties were saturated. The alkyl chain length distribution was 0.02%—$C_{14}$, 12.2%—$C_{16}$, 85.6%—$C_{18}$, 2.0%—$C_{20}$.

A premix of vitamins and minerals, was prepared containing:

| | Percent |
|---|---|
| Vitamin C (ascorbic acid) | 86.6 |
| Folacin | .0482 |
| Vitamin $B_1$ (thiamine) | .3564 |
| Niacin | 2.9490 |
| Vitamin $B_6$ (pyridoxine hydrochloride) | 1.5380 |
| Potassium iodide | .0492 |
| Vitamin $B_2$ (riboflavin) | .0004 |
| Dicalcium phosphate | 8.4588 |
| | 100.0000 |

The mixture of vitamins and minerals had particle sizes within the following range: 96% through a 60-mesh screen, 70% through a 200-mesh screen, and 40% through a 325-screen. The premix was added with stirring to the molten monoglyceride and then pumped to a two-roll chill roll. One of the rolls was 8 inches in diameter and heated with 5 p.s.i.g. steam. The other roll was 4 feet in diameter and cooled with city water at 70° F. Both rolls were 10 feet long and were rotated at the same peripheral speed. The gap between the rolls was adjusted to 0.01 inches. A doctor blade was utilized to scrape the solidified film from the cooled roll.

The continuous film was passed through a breaker bar which divided the solidified film into pieces having a surface diameter of about ½ inch. These flakes were held at room temperature for 24 hours and then conveyed to a Urschel cutter. Therein the pieces were cut into flakes; 60% of the flakes having a surface diameter between ⅛ inch and ¼ inch. The resultant vitamin flakes were fed continuously by a vibratory feeder into a conveyor line containing dehydrated potato flakes. The dehydrated potato flakes had thicknesses from about 0.007 to 0.010 inches and a moisture content ranging from 5.5 to 6 weight percent. Over 60% of the surface diameters were within the range of ⅛ to ¼ inch.

The potato flakes were conveyed at a rate of 99½ lbs. per minute and the vitamin flakes were added to this conveyor and mixed with the potato flakes at the rate of ½ lb. per minute. The bulk density of the resultant product ranged between 0.238 and 0.263 g./cc.

The vitamin flakes were not visible to the untrained eye within the flaked potato product and the nutritional level of the resultant product was substantially equal to the nutritional level of freshly dug potatoes.

A storage test was conducted wherein an analysis was made of the following vitamins: Vitamin $B_2$ (riboflavin), Niacin, Vitamin $B_1$ (thiamine) and Vitamin C (ascorbic acid). In Table 3 the initial vitamin content of the potato product of this invention is compared with potato flakes which were not fortified.

TABLE 3

| Vitamin | Vitamin enriched potato product | Natural potato product |
|---|---|---|
| Vitamin $B_2$ (riboflavin) | 0.139 mg./100 gms. | 0.090 mg./100 gms. |
| Niacin | 8.42 mg./100 gms. (Top A) 8.60 mg./100 gms. (Middle B) 7.56 mg./100 gms. (Bottom C) | 6.12 mg./100 gms. |
| Vitamin $B_1$ (thiamine) | 0.72 mg./100 gms. | 0.10 mg./100 gms. |
| Vitamin C (ascorbic acid) | 127 mg./100 gms. | 14.7 mg./100 gms. |

The following analytical procedures were used to determine the vitamin level:

Vitamin $B_2$ (riboflavin): *Association of Official Agricultural Chemists*, 789 (1970) 11th ed.

Niacin: *Association of Official Agricultural Chemists*, 787 (1970) 11th ed.

Vitamin $B_1$ (thiamine): *Association of Official Agricultural Chemists*, 758 (1965) 10th ed.

Vitamin C (ascorbic acid): *J. Biol. Chem.*, 160, 217 (1945)

Storage tests were run at 6 weeks, 12 weeks and 30 weeks and in each case substantially all of the vitamins were available in non-degraded form.

TABLE 4
(6 week storage)

| Vitamin | Room temperature storage | 100° F. storage |
|---|---|---|
| Vitamin C (ascorbic acid) | 122 mg./100 gms. | 117 mg./100 gms. |
| Vitamin B₁ (thiamine) | 0.68 mg./100 gms. | 0.62 mg./100 gms. |
| Vitamin B₂ (riboflavin) | 0.127 mg./100 gms. | 0.107 mg./100 gms. |
| Niacin | 7.56 mg./100 gms. | 7.36 mg./100 gms. |

TABLE 5
(12 week storage)

| Vitamin | Room temperature storage | 100° F. storage |
|---|---|---|
| Vitamin C (ascorbic acid) | 123 mg./100 gms. | 113 mg./100 gms. |
| Vitamin B₁ (thiamine) | 0.74 mg./100 gms. | 0.61 mg./100 gms. |
| Niacin | 7.52 mg./100 gms. | 8.00 mg./100 gms. |
| Vitamin B₂ (riboflavin) | 0.124 mg./100 gms. | 0.150 mg./100 gms. |

EXAMPLE 6

(30 Week Storage)

Vitamin: Room temperature storage
Vitamin C (ascorbic acid) _____ 100 mg./100 gms.
Vitamin $B_1$ (thiamine) _____ 0.73 mg./100 gms.
Vitamin $B_2$ (riboflavin) _____ .157 mg./100 gms.
Niacin _____ 7.10 mg./100 gms.

As can be seen from the above tables, the encapsulated vitamins are not denatured over long periods of time even under rather severe storage conditions. In the product maintained at 100° F., the vitamin flakes did not "grease out" on the potato flakes and did not affect rehydration characteristics of the flakes.

Example II

Dehydrated potato flakes having a thickness of between 0.007 and 0.010 inches and over 60% of the surface diameters in the range of 1/16 inch to 1/4 inch were made from the following components:

| | |
|---|---|
| Potato flakes | 98.4526 |
| Dicalcium phosphate | 0.6200 |
| Mono- and diglycerides | 0.5000 |
| Citric acid | 0.2000 |
| Magnesium oxide | 0.1400 |
| Sodium bisulfite | 0.0300 |
| Calcium stearoyl-2-lactylate | 0.0300 |
| Sodium acid pyrophosphate | 0.0200 |
| Ferric orthophosphate | 0.0055 |
| BHA | 0.0015 |
| Vitamin $B_2$ (riboflavin) | 0.0004 |
| | 100.0000 |

The final product contained about 5.5% by weight water (included in the potato flakes).

The vitamin flakes were made by the process described in Example I and were of the same approximate size. The vitamin flakes contained:

| | |
|---|---|
| Monoglycerides (as described in Example I) | 61.00000 |
| Ascorbic acid | 33.77401 |
| Folacin | 0.01781 |
| Niacinamide | 1.15011 |
| Thiamin mononitrate | 0.13900 |
| Pyridoxine HCl | 0.59982 |
| Dicalcium phosphate | 3.31925 |
| | 100.00000 |

0.6 lbs. of vitamin flakes were added to 99.4 lbs. of the potato flakes as described in Example I. The vitamin flakes were substantially invisible to the eye and no negative color or taste characteristics could be attributed to the addition of the vitamin flakes. The potato product contained a vitamin content substantially the same as freshly dug potatoes.

The potato flakes were packed into one-pound packages. The packages, with the top flaps extending upwardly, were filled to the top of the flaps. While being conveyed, the product settled below the top of the package (about 1½ inches). Just prior to sealing, several packages were removed and, in each package, the top portion and bottom portions were sampled and tested for ascorbic acid content. The results of that testing are set forth in the table below.

TABLE 7
Tests For Segregation of Vitamin Flakes

| Package | Percent of ascorbic acid in top portion | Percent of ascorbic acid in bottom portion | Difference |
|---|---|---|---|
| 1 | .239 | .283 | −.044 |
| 2 | .227 | .229 | −.002 |
| 3 | .114 | .152 | −.038 |
| 4 | .166 | .167 | −.001 |
| 5 | .234 | .283 | −.049 |
| 6 | .212 | .224 | −.012 |
| 7 | .168 | .176 | −.008 |
| 8 | .195 | .181 | .041 |
| 9 | .169 | .159 | .010 |
| 10 | .269 | .240 | .029 |
| 11 | .217 | .218 | −.001 |
| 12 | .153 | .161 | −.008 |
| 13 | .198 | .134 | .064 |
| 14 | .289 | .169 | .120 |
| 15 | .168 | .217 | −.049 |
| 16 | .193 | .193 | .000 |
| 17 | .216 | .284 | −.068 |
| 18 | .162 | .190 | −.028 |
| 19 | .233 | .222 | .011 |
| 20 | .173 | .191 | −.018 |
| 21 | .151 | .228 | −.077 |
| 22 | .207 | .175 | .032 |
| 23 | .269 | .218 | .051 |
| 24 | .245 | .163 | .082 |
| 25 | .204 | .204 | .000 |
| 26 | .245 | .255 | −.010 |
| 27 | .221 | .213 | .008 |
| 28 | .256 | .246 | .010 |
| 29 | .214 | .214 | .000 |
| 30 | .150 | .176 | −.026 |
| 31 | .217 | .230 | −.013 |
| 32 | .176 | .234 | −.058 |
| 33 | .205 | .171 | .034 |
| 34 | .207 | .184 | .023 |
| 35 | .229 | .259 | −.030 |
| 36 | .204 | .212 | −.008 |

Tests were run only for ascorbic acid content because the ascorbic acid was distributed evenly throughout the vitamin flakes. Large differences in ascorbic acid content between the top and the bottom of the package would indicate segregation. As indicated above, the difference between top and bottom is negligible—essentially no segregation occurred.

Example III

When, in the above examples, the following fats are substituted for distilled monoglycerides, essentially the same results are achieved: capric monoglyceride, lauric monoglyceride, myristic monoglyceride, capric diglyceride, lauric diglyceride, myristic diglyceride, lauric triglyceride, myristic triglyceride, palmitic triglyceride, stearic triglyceride, hydrogenated cottonseed oil, hydrogenated soybean oil and hydrogenated safflower oil. All of these fats have a Wiley melting point or congeal point in the range of 110° F. to 165° F.

What is claimed is:
1. A dehydrated potato product comprising:
 (a) from 95% to 99.9% by weight of said product of dehydrated potato flakes having thicknesses from about 0.005 inches to about 0.015 inches and a majority of surface diameters from about 1/16 inch to 1/4 inch and containing from about 4% to 10% water;
 (b) from about 0.1% to about 5% by weight of said product of vitamin flakes having thicknesses from about 0.005 inches to about 0.025 inches wherein at least 60% of the surface diameters are within the range of 1/16 inch to 1/4 inch, said vitamin flakes comprising:
  (i) from 50% to 75% by weight of said vitamin flakes of substantially saturated fats having alkyl chain lengths of from 6 carbon atoms to 26 carbon atoms and mixtures thereof and having a Wiley melting point between 110° F. and 165° F.;

(ii) from 10% to 50% by weight of said vitamin flakes of water-soluble vitamins, said vitamins having a particle size of less than 0.018 inches and being encapsulated within said fat;

(iii) from 0% to 40% by weight of said vitamin flakes of minerals, said minerals having a particle size of less than 0.018 inches and being encapsulated within said fat.

2. The dehydrated potato product of Claim 1 wherein the vitamins are selected from the group consisting of Vitamin $B_1$ (thiamine), Vitamin $B_2$ (riboflavin), Vitamin $B_6$ (pyridoxine hydrochloride), Vitamin C (ascorbic acid), niacin, folacin, biotin and pantothenic acid.

3. The dehydrated potato product of Claim 2 wherein the minerals are selected from the group consisting of food grade salts of calcium, phosphorous, iodine, iron, magnesium, zinc and copper.

4. The dehydrated potato product of Claim 3 wherein the vitamin flakes comprise from 0.5% to 1% by weight of the product, wherein the thicknesses of the vitamin flakes are from 0.007 inches to 0.020 inches, and wherein at least 80% of the surface diameters of the vitamin flakes are between 1/8 inch and 1/4 inch.

5. The dehydrated potato product of Claim 4 wherein the vitamin flakes comprise from 60% to 70% by weight of said fat wherein the fat has alkyl chain lengths of from 12 carbon atoms to 18 carbon atoms and a Wiley melting point of from 130° F. to 155° F.

References Cited

UNITED STATES PATENTS

| | | | |
|---|---|---|---|
| 2,777,797 | 1/1957 | Hachberg | 99—11 |
| 2,027,264 | 3/1962 | Irmiter | 99—207 |
| 3,056,728 | 10/1962 | Ohtaki | 99—207 |
| 3,063,849 | 11/1962 | Nelson | 99—207 |
| 3,219,464 | 11/1965 | Cole | 99—207 |
| 3,343,970 | 9/1967 | Pader | 99—207 |

WILBUR L. BASCOMB, JR., Primary Examiner

M. G. MULLEN, Assistant Examiner

U.S. Cl. X.R.

426—142, 311, 342, 372, 465